United States Patent
Tomm

(10) Patent No.: US 12,121,014 B2
(45) Date of Patent: Oct. 22, 2024

(54) ELECTRIC-SHOCK SOIL TREATMENT APPARATUS AND METHOD THEREOF

(71) Applicants: BODEN, LLC, Lafayette, IN (US); Bryan Christopher Tomm, Carmi, IL (US)

(72) Inventor: Bryan Christopher Tomm, Carmi, IL (US)

(*) Notice: Subject to any disclaimer, the term of this patent is extended or adjusted under 35 U.S.C. 154(b) by 918 days.

(21) Appl. No.: 16/971,730

(22) PCT Filed: Feb. 21, 2019

(86) PCT No.: PCT/US2019/018995
§ 371 (c)(1),
(2) Date: Aug. 21, 2020

(87) PCT Pub. No.: WO2019/165099
PCT Pub. Date: Aug. 29, 2019

(65) Prior Publication Data
US 2020/0390081 A1 Dec. 17, 2020

Related U.S. Application Data

(60) Provisional application No. 62/634,786, filed on Feb. 23, 2018.

(51) Int. Cl.
*A01M 17/00* (2006.01)
*A01B 49/02* (2006.01)
(Continued)

(52) U.S. Cl.
CPC ........... *A01M 17/00* (2013.01); *A01B 49/027* (2013.01); *A01B 49/06* (2013.01); *A01C 21/002* (2013.01); *A01M 19/00* (2013.01); *A01M 21/046* (2013.01); *H02K 7/1807* (2013.01); *H02K 11/0094* (2013.01)

(58) Field of Classification Search
CPC ...... A01M 17/00; A01M 21/04; A01M 21/00; A01M 19/00; A01M 21/046; A01B 49/027; A01B 49/06; A01B 49/02; A01B 49/00; A01B 49/04; A01C 21/002; A01C 21/00; H02K 7/1807; H02K 11/0094; H02K 7/18; H02K 7/08; H02K 7/00
See application file for complete search history.

(56) References Cited

U.S. PATENT DOCUMENTS

| 4,177,603 A | 12/1979 | Dykes |
| 4,338,743 A | 7/1982 | Gilmore |

(Continued)

FOREIGN PATENT DOCUMENTS

| DE | 19703283 A1 * | 8/1998 | ........... F16D 1/0858 |
| WO | WO-9807314 A1 * | 2/1998 | ........... A01M 21/046 |

*Primary Examiner* — Christopher J. Novosad
(74) *Attorney, Agent, or Firm* — Gutwein Law; Tyler B. Droste

(57) ABSTRACT

An electric-shock soil treatment apparatus and method for treating soil. The electric shock soil treatment apparatus can be an attachment that can either be easily retrofitted or designed into existing and new agricultural equipment. The system can provide a sustainable solution for stabilizing nitrogen fertilizers. The electric shock soil treatment system also provides other effective alternative solutions that would benefit from reduced soil microbial activity or from additional weed control.

12 Claims, 17 Drawing Sheets

(51) Int. Cl.
*A01B 49/06* (2006.01)
*A01C 21/00* (2006.01)
*A01M 19/00* (2006.01)
*A01M 21/04* (2006.01)
*H02K 7/18* (2006.01)
*H02K 11/00* (2016.01)

(56) References Cited

U.S. PATENT DOCUMENTS 6,237,278 B1 5/2001 Persson
6,853,561 B2 2/2005 Elek

* cited by examiner

ELECTRIC-SHOCK SOIL TREATMENT APPARATUS AND METHOD THEREOF

CROSS-REFERENCE TO RELATED APPLICATION

This U.S. Patent Applications Patent Applications claims priority to PCT application PCT/US19/18995 filed Feb. 21, 2019, which claims priority to U.S. Provisional Application 62/634,786 filed Feb. 23, 2018, the disclosure of which is considered part of the disclosure of this application and is hereby incorporated by reference in its entirety.

FIELD OF THE INVENTION

This present disclosure relates generally to treating soil, more specifically, the present disclosure relates to an apparatus and method for treating soil to control living organisms in the soil. One specific implementation includes the reduction in nitrate mobilization in agricultural fields by applying electricity to the soil.

BACKGROUND

Various soil bacteria effect the behavior of many agronomic conditions. In one example, commercial nitrogen fertilizers undergo a molecular change facilitated by bacteria in the soil. The result of this process is nitrate. Nitrate is more available for plant uptake but is also water soluble and subject to accidental mobilization and leaching. By treating the bacteria, the conversion process can be slowed. And, less nitrate is at risk of moving out of reach of plant roots and into waterways. Existing nitrogen stabilizers use chemical compounds to affect the bacteria and achieve similar results. However, chemical compounds are corrosive to farm implements and require a carrier solution. They are also expensive to the farmer.

Previous apparatus utilizing electricity have been focused on weed control by providing an electric current to weeds to destroy the invasive vegetation grouping in the soil, such as U.S. Pat. Nos. 4,338,743, 4,177,603, and 6,237,278. These patents do not exhibit how an electrification process of the soil can be used to inhibit organisms within the soil and furthermore fumigate crops while also facilitating fertilization of a crop bed simultaneously.

In one exemplary embodiment of the present disclosure, the apparatus and method of the present disclosure solves these problems by applying a high frequency, high voltage charge to a treatment zone of the ground soil while an implement moves at normal operating speeds. This treatment can reduce the microbial activity and availability in the application zone. This mode of action has other practical applications in agriculture and can be used for creating a safe zone, free of harmful pathogens, of soil for seed germination and reducing weed and insect pressure on row crops, and fumigation of other crop pests. Beneficial bacteria and/or fertilizers can also be introduced into the controlled soil environment as part of a singular field operation. Similarly, a constant voltage can be applied using a DC output to the treatment zone while the implement moves.

There exists a need for a system to inhibit organisms in the soil at field operating speeds at a lower cost to the farmer. This includes control of nitrification, denitrification, fumigation and volatilization processes in soil, which stabilizes applied nitrogen fertilizer from moving out of the soil. Similarly, a need exists for a system having modern circuitry to produce pulsed electric fields to inhibit the conversion processes of nitrogen in soil by means of cellular destruction, irreversible electroporation, or electropermeabilization, of cell membranes of most single-celled organisms within the soil treatment zone.

BRIEF SUMMARY OF THE INVENTION

This present disclosure provides for a management tool that helps solve the problem of nitrate mobilization in agricultural fields which can most notably lead to nitrate leaching into nearby waterways. It can also be used as a management tool to help solve other common soil related agronomic problems such as weed control, soil-borne diseases, and insect pressure.

The electric shock soil treatment apparatus of the present disclosure can provide a sustainable solution for stabilizing nitrogen fertilizers and reducing microbial activity in treated zones, which will in turn provide economic opportunities for the user as well as environmental benefits from more wide spread adoption of the practice.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein.

DETAILED DESCRIPTION OF THE INVENTION

Figure 1:
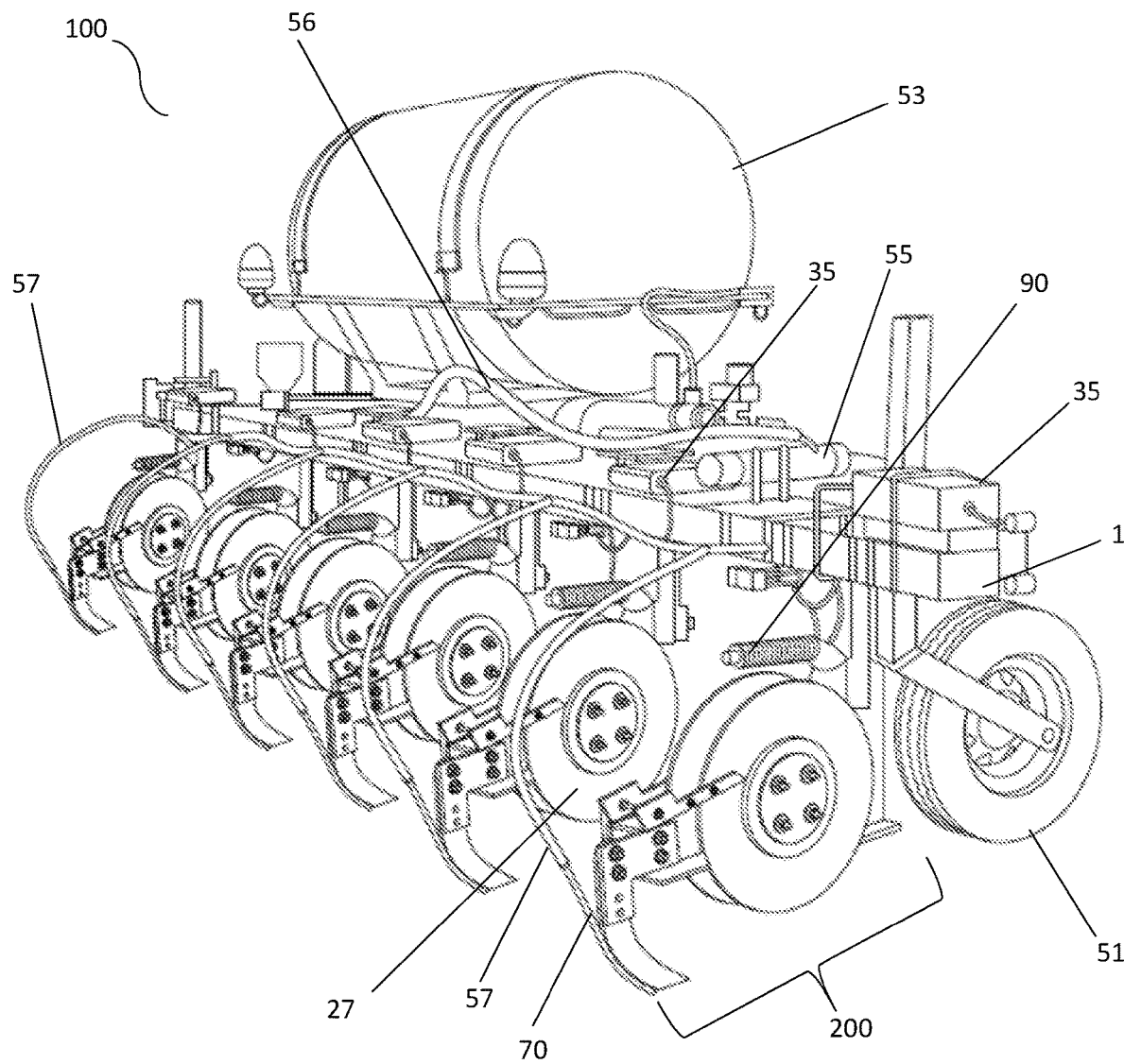
FIG. 1 is a diagram of an exemplary embodiment of the apparatus of the present disclosure.

In accordance, with FIGS. 1-10, the apparatus and method of the present disclosure provides for an apparatus and method that helps solve the problem of nitrate mobilization in agricultural fields which can most notably lead to nitrate leaching into nearby waterways. It can also be used as a management tool to help solve other common soil related agronomic problems such as weed control, soil-borne diseases, and insect pressure. Similarly, the method and apparatus of the present disclosure can be used for soil fumigation to further remove pests that reside in or proximate to the soil.

The electric shock soil treatment apparatus of the present disclosure can provide a sustainable solution for stabilizing nitrogen fertilizers and reducing microbial activity in treated zones, which will in turn provide economic opportunities for the user as well as environmental benefits from more wide spread adoption of the practice.

An exemplary embodiment of the present disclosure can produce electric fields to inhibit the conversion processes of nitrogen in soil by means of cellular destruction, irreversible electroporation, or electropermeabilization, of cell membranes of most single-celled organisms within the soil treatment zone. In some exemplary embodiments, the electric fields used can be pulsed AC fields or constant DC currents. Once a pore is opened in a cell wall, the normal metabolic processes, primarily related to osmosis, declines and in cases of multiple prorations entirely stop which results in the disabling of the effected cell. It is believed that irreversible electroporation of cell walls will occur with as little as about 10,000 volts/cm electric field at durations longer than about 3 microseconds. In some exemplary embodiments, high frequency pulsed direct or alternating current electric fields can be ideal for successful implementation of the apparatus and method of the present disclosure as an in situ retrofit to row crop agriculture practices. Other embodiments can use non-pulsed direct currents to apply an electrical charge to the treatment zone. Similar results of obtaining irreversible electroporation of cell walls can be achieved with electric fields of less magnitude and frequency, but it would become impractically slow to treat useful regions of the soil.

Existing nitrogen stabilizers use chemical compounds to achieve similar results. Prior patents of similar claims do not use efficient electrical generation or have the ability to be a retrofitted application onto modern agricultural equipment. They also do not have the capability to be implemented in situ with other agricultural application practices at speeds above about four miles per hour.

The apparatus and method of the present disclosure improves on previous methods and machinery currently used in the field. One exemplary embodiment of the present disclosure can use pulsed electric fields to inhibit the conversion processes of nitrogen in soil. The pulsed electric fields that are generated in this system can utilize voltages that range between about 5,000 volts to about 500,000 volts at frequencies between about 1,000 hertz to about 500,000 hertz or about 10,000 volts to about 250,000 volts at frequencies between about 30,000 hertz to about 200,000 hertz or about 30,000 volts to about 70,000 volts at frequencies between about 30,000 hertz to about 60,000 hertz. As previously noted, this system can be applied agronomically to other situations in a soil zone where bacterial and fungal pathogens may need to be eradicated.

Figure 7:
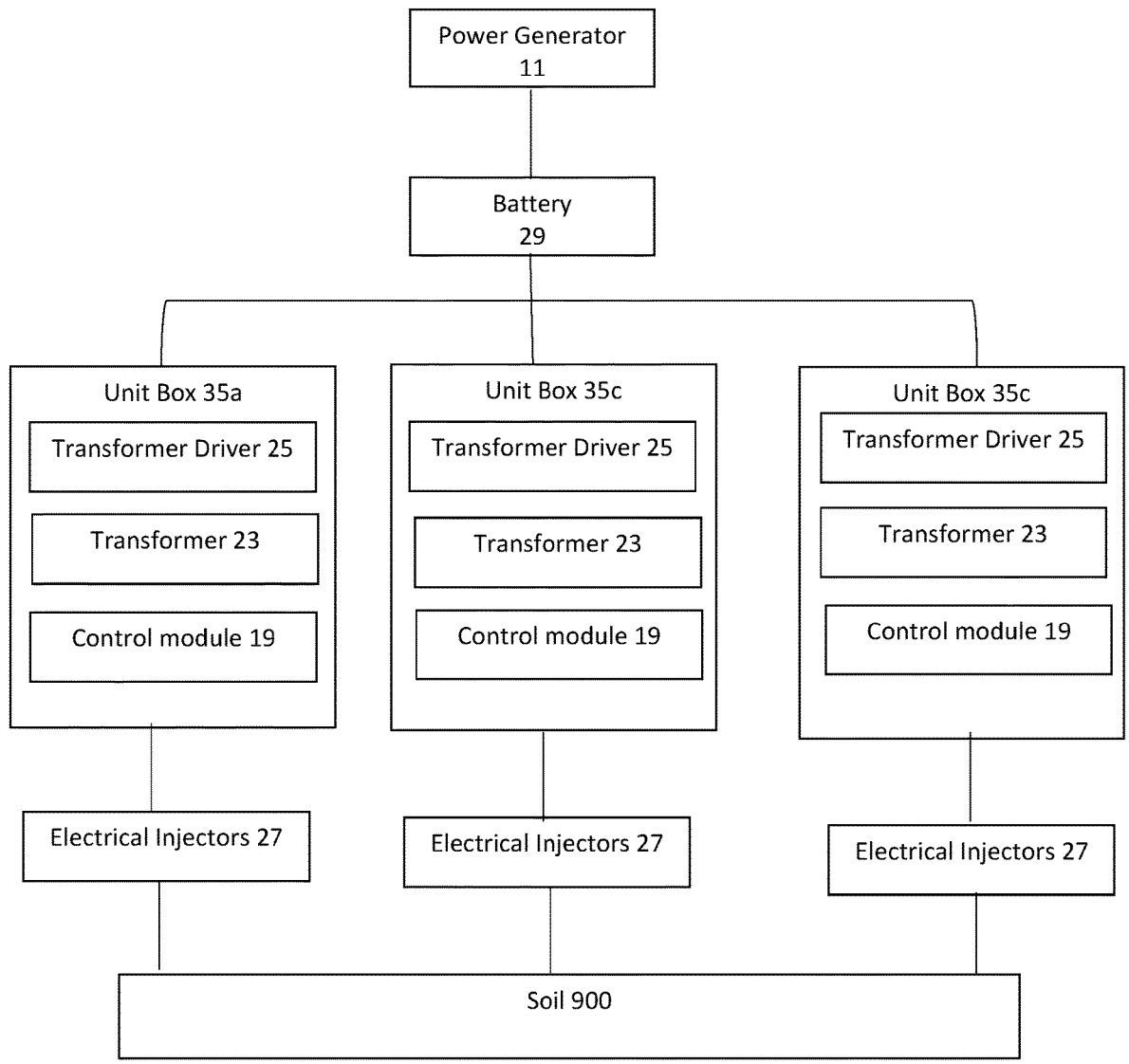
FIG. 7 is a diagram of an exemplary embodiment of the soil treatment apparatus of the present disclosure.

FIG. 1 illustrates an implement 100 for providing an electric shock soil treatment that can be pulled by a vehicle 300, such as a tractor. The electric shock soil treatment implement 100 can provide a sustainable solution for stabilizing nitrogen fertilizers, which can in turn provide economic opportunities for the user as well as environmental benefits from more wide spread adoption of the practice. As shown in FIG. 7, one exemplary embodiment of the present disclosure can include an electric generator 11, supply voltage wiring 13, high voltage wiring 15, hydraulic motor 17 (with supply hoses), a control module 19 (optional), control wiring 21, a line output transformer 23 (voltage transformer), a transformer driver 25, an electrical injectors 27, that can operate as delivery system of the electrical field to soil, and one or more power storage devices 29, such as a battery. A power storage device 29, such as a battery, can be configured to aid the implement to provide a level voltage of electricity from the generator to the unit boxes or transformer drivers. control module 19, transformer driver(s), and transformer 23 can be housed in a row unit box 35. Each electrical injector 27 can have a corresponding row unit box 35. In one exemplary embodiment, the electrical injector system 27 can comprise a coulter assembly 200 as shown in FIGS. 1-2B.

Figure 2A:
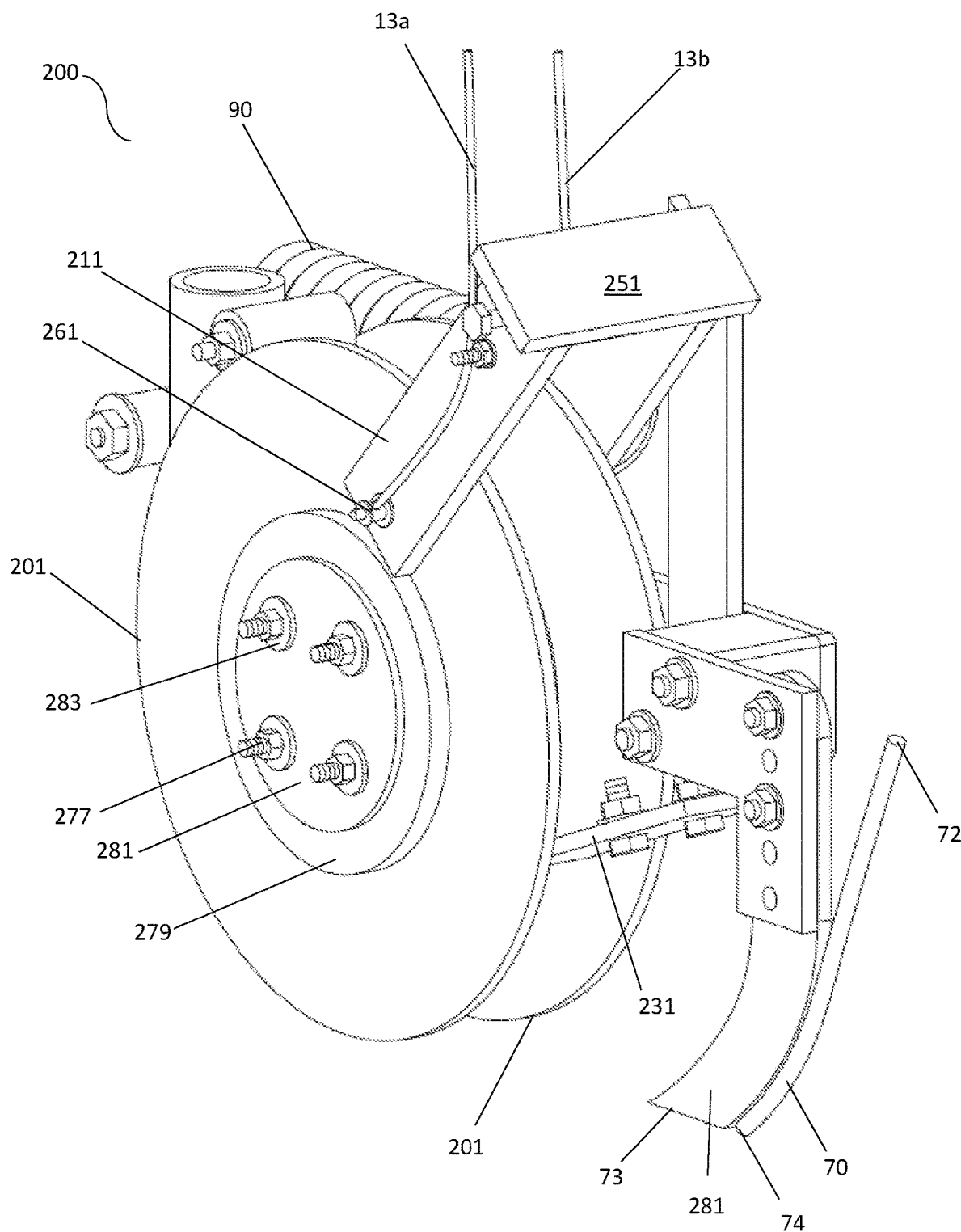
FIG. 2A is a perspective view of a coulter assembly to be used for providing electrical voltage to the soil.
Figure 2B:
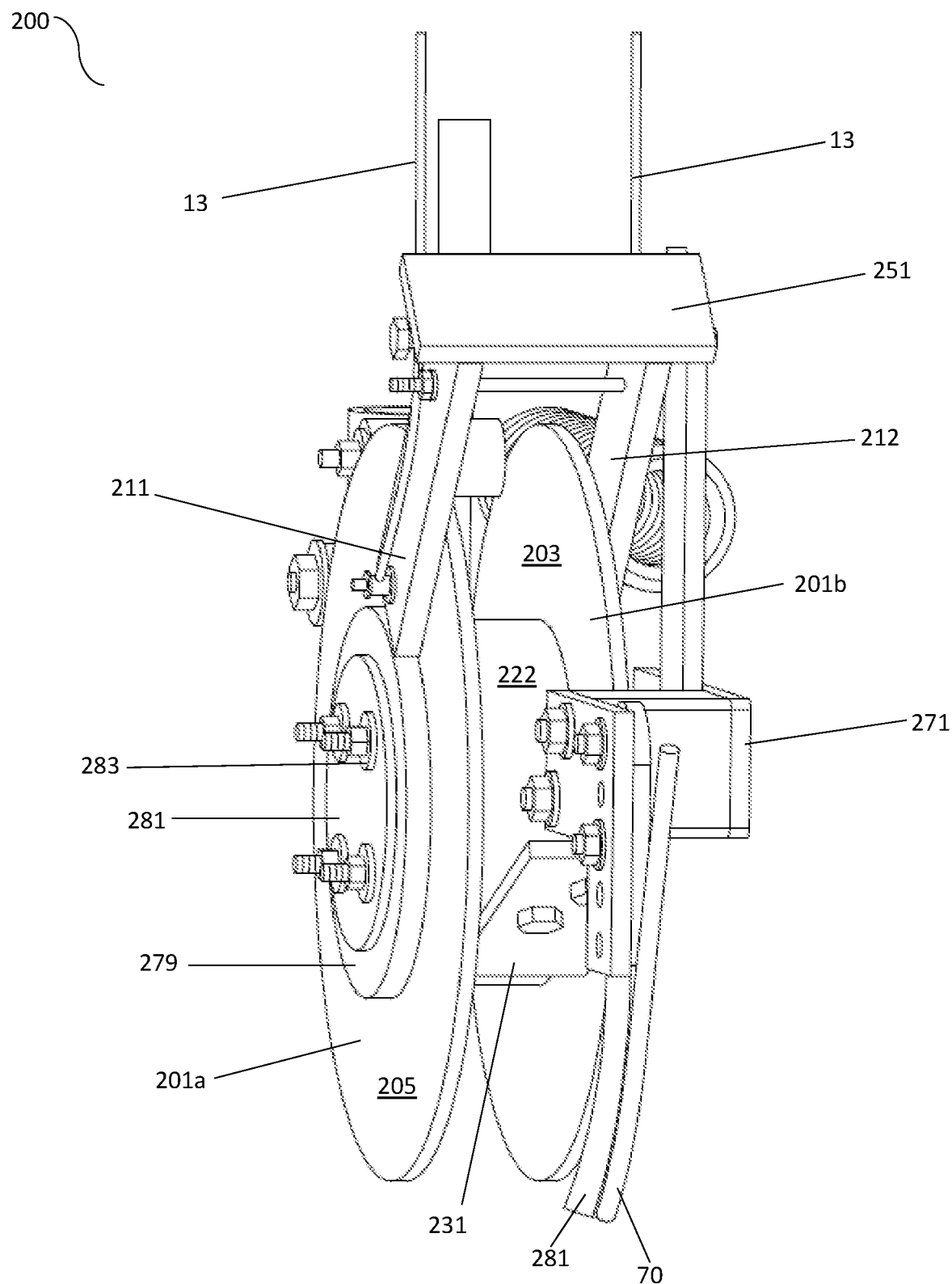
FIG. 2B is another perspective view of a coulter assembly to be used for providing electrical voltage to the soil.
Figure 9A:
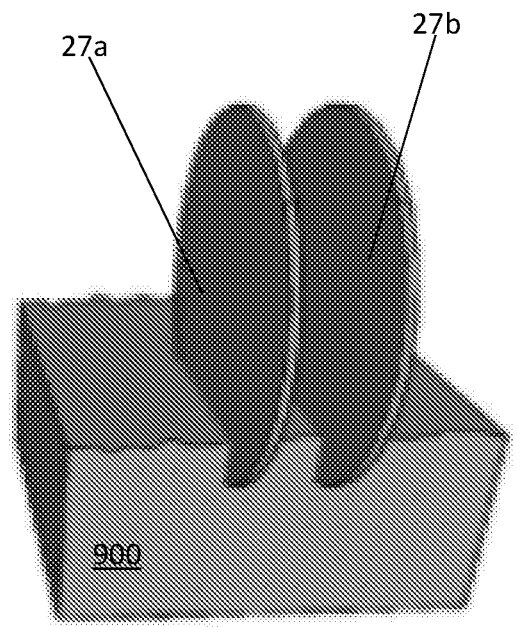
FIG. 9A is an illustration of an exemplary embodiment of the of an exemplary embodiment of the electric shock soil treatment apparatus of the present disclosure treating the soil.
Figure 9B:
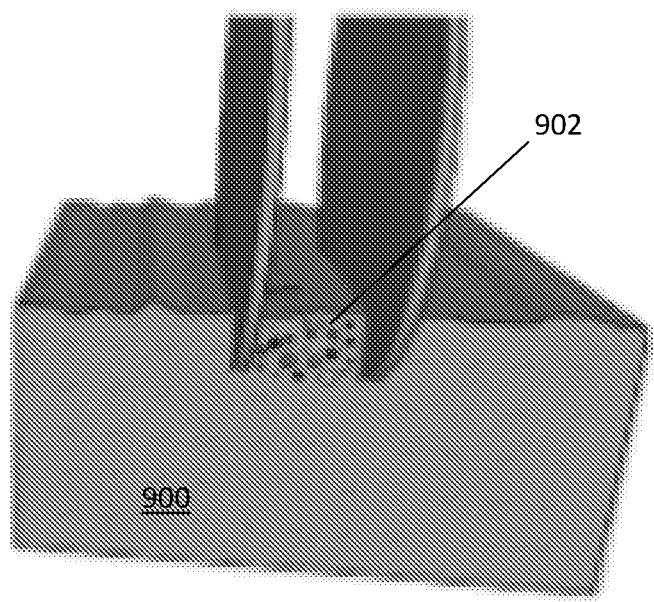
FIG. 9B is an illustration of the treatment soil containing an number of microbes in the soil.
Figure 9C:
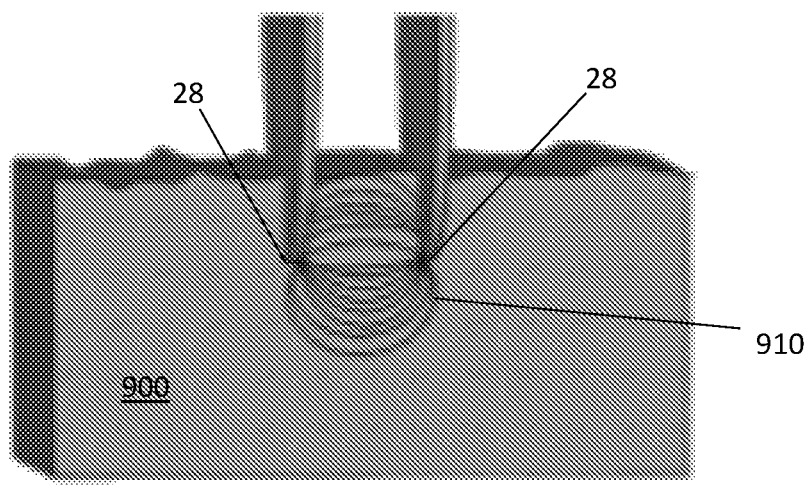
FIG. 9C is an illustration an electric field being generated by the system of the present disclosure between two coulters of a coulter assembly.

As shown in FIGS. 2A-2C, one exemplary embodiment, coulter assembly 200 can include two or more discs 201 spaced a pre-determined distance apart from each other. The coulters can have an interior side 203 and an exterior side 205, wherein the two interior sides of the respective coulters 201 face each other in a generally parallel orientation. In one exemplary embodiment, the pre-determined distance can be between about 1 inch and 10 inches, between about 2 inches and 6 inches, or about 3 inches. The coulter discs 201 can be configured to operate as electrical injectors 27 into the soil. As shown in FIGS. 9A-C, the electric field can be generated between the two or more discs to create a treatment. The electricity is applied to the soil 900 to create and effective treatment zone 901 as the discs move through the soil.

In one exemplary embodiment, an electric generator 11 can produce direct current or alternating current electricity from power that can be supplied by any adequate power source 11, such as a hydraulic motor. This electricity can then be delivered to a storage device 29 and then to each electrical injector system 27 on the system via the supply wiring 13. Prior to being transported to the electrical injector system 27, the electricity can be converted to the desirable voltage, amperage, and frequency through a transformer driver 25 and a voltage transformer 23. An optional control module 19 can allow the operator to adjust, control, and manipulate the electrical intensity of the system via the control wiring 21. The electric injectors, or soil delivery system 27, may consist of injection points that deliver the electric charge that flows from the unit box 35, delivered by supply voltage wiring 13, conditioned by the transformer driver 25, and can be increased by the line out transformer 23. A control module 19 can be used to control each electrical injector system 27. Alternatively, each electrical injector system 27 can have a respective control module 19. Additionally, the control module 19 can include one or more sensors to monitor voltage and frequency of the electrical field at various points throughout the electrical transmission from the voltage generator to the electrical injectors to ensure proper voltage and frequency are maintained throughout the system.

In one exemplary embodiment, a DC current can be pulsed using one or more transformer drivers 25 to pulse the current. The current can then be input into a transformer 23. The transformer driver 25 can either allow for a downstream current that is either pulsed DC or alternating current prior to exiting the unit box and flowing to the electrical injector system 27. The electrical injector system 27 can then deliver a pulsed electric field to the soil. In some exemplary embodiment, the electrical injector system 27 can use a coulter assembly 200 having a plurality of injection points 28, wherein a pulsed electric field is delivered across the soil between two conductor points 28 of the electrical injector system 27.

An exemplary embodiment of the present disclosure can be implemented using the following system and method. The electric generator 11 works to produce direct or alternating current electricity. In some exemplary embodiments, the direct current can be transferred through a driver board that can be used to switch the direct current to alternating current. Similarly, driver circuitry can be used to condition the electricity generated by the power generator 11. In some embodiments, the driver circuitry can be used to condition the voltage the DC or AC current after it passes through the transformer driver 25. The conditioned electricity can then be transported to a high voltage transformer 23 and then can pass through to the injection points 28 of the electrical injectors 27 into the soil. In some exemplary embodiments, supply voltage wiring can transmit and carries the electricity the electrical power generator 11 to each transformer driver 25. The high voltage wiring 15 carries voltage from the transformer 23 to the injection points of the electrical injectors 27. In some exemplary embodiments, the electrical injector system 27 can include at least two
injector points, wherein one injection point is positively charged, and the corresponding injection point is negatively charged. The injection points are configured to draw the electrical field across the soil between the two injection points 28 thereby creating a treatment zone 901, as shown in FIGS. 9A-F. A hydraulic motor can provide rotational power to the electric generator 11. The system can further include an optional control module 19 allows easy interaction from the operator to the electric generator 11 to increase or decrease the intensity and/or frequency of the electricity through transformer drivers 25 via the control wiring. The control wiring 21 can provide communication from user inputs to the control module 19.

Figure 8:
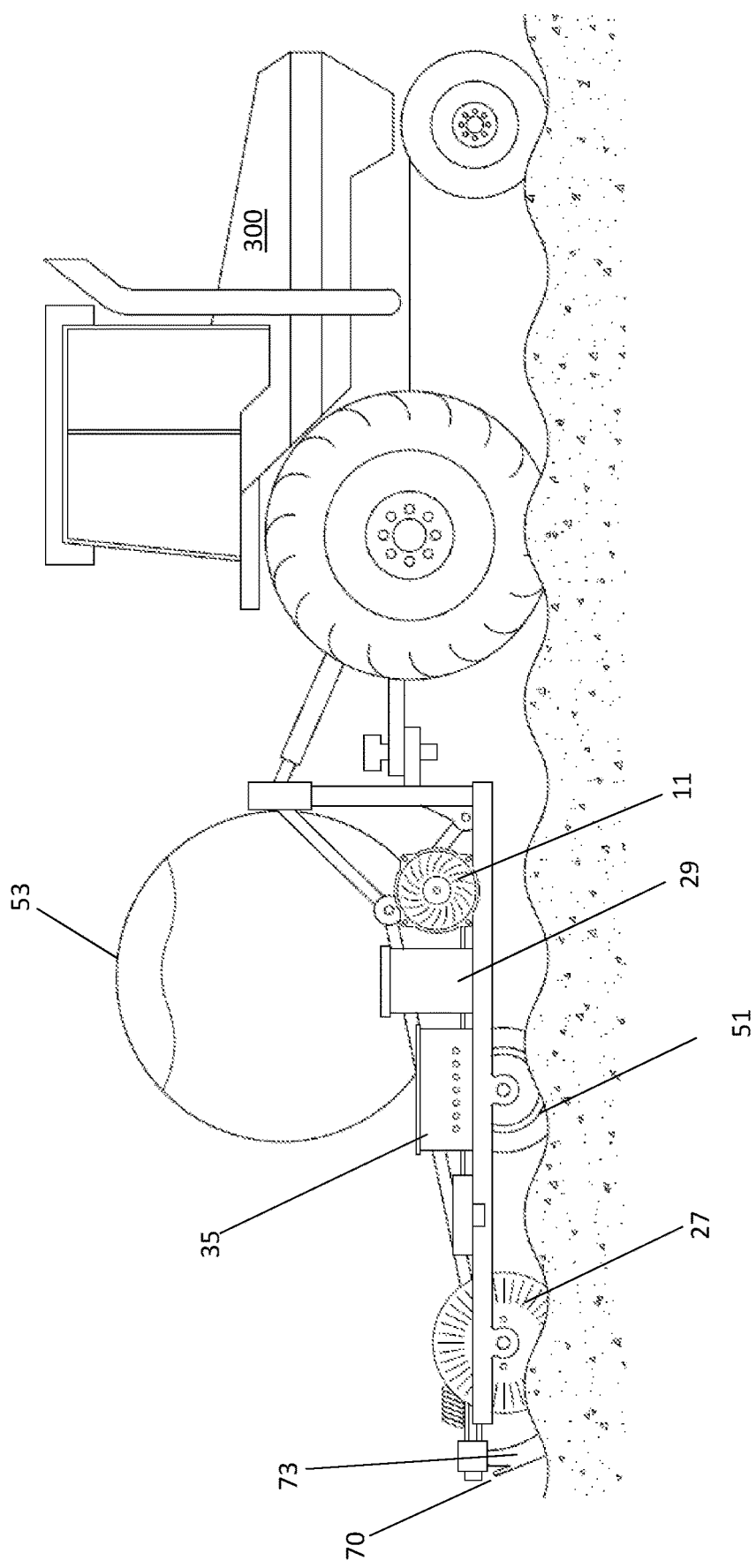
FIG. 8 is an image of a vehicle pulling an exemplary embodiment of soil treatment apparatus of the present disclosure.

One or more voltage transformers 23 can step up the voltage to the desired level to control microbial activity in the soil. The electric field produced between the injection points of the electrical injectors 27 can be set for a predetermined duration that is determined by the transformer driver 25. The electrical injectors can be various types of injectors, including but not limited to wires, troughs, poles or rods, and coulter discs among others. The transformer driver 25 can control the voltage transformer 23 by sending output voltages and frequencies that are controlled by a control module 19. The transformer driver 25 can utilize zero voltage switching technology at very high frequencies to produce large voltage spikes in the line output transformers. Each row of coulter assemblies can have a corresponding line output transformer. The injection points of the electrical injectors 27, or delivery system, can provide an injection site to deliver the electric current into soil. The various elements recited above can be coupled to a trailer portion 1 of the implement 100 having one or more wheels 51. The wheels 51 can be moveable between one or more positions. In one exemplary embodiment, the wheels have a first position and a second position. When in the first position the electrical injectors 27 are raised above the ground level at predetermined position and unable to apply a treatment to the soil. In the second position, the injectors are able to interface with the soil. The trailer portion 1 can be pulled using any suitable vehicle such as a tractor as illustrated in FIG. 8. The trailer portion 1 can house multiple drivers 25, wherein each driver 25 can correspond to a specific coulter assembly 200. The trailer 1 can include one or more coulter assemblies 200 to provide a number of electrical injection points and broader treatment area/zone 901 across the ground of a field.

Figure 10:
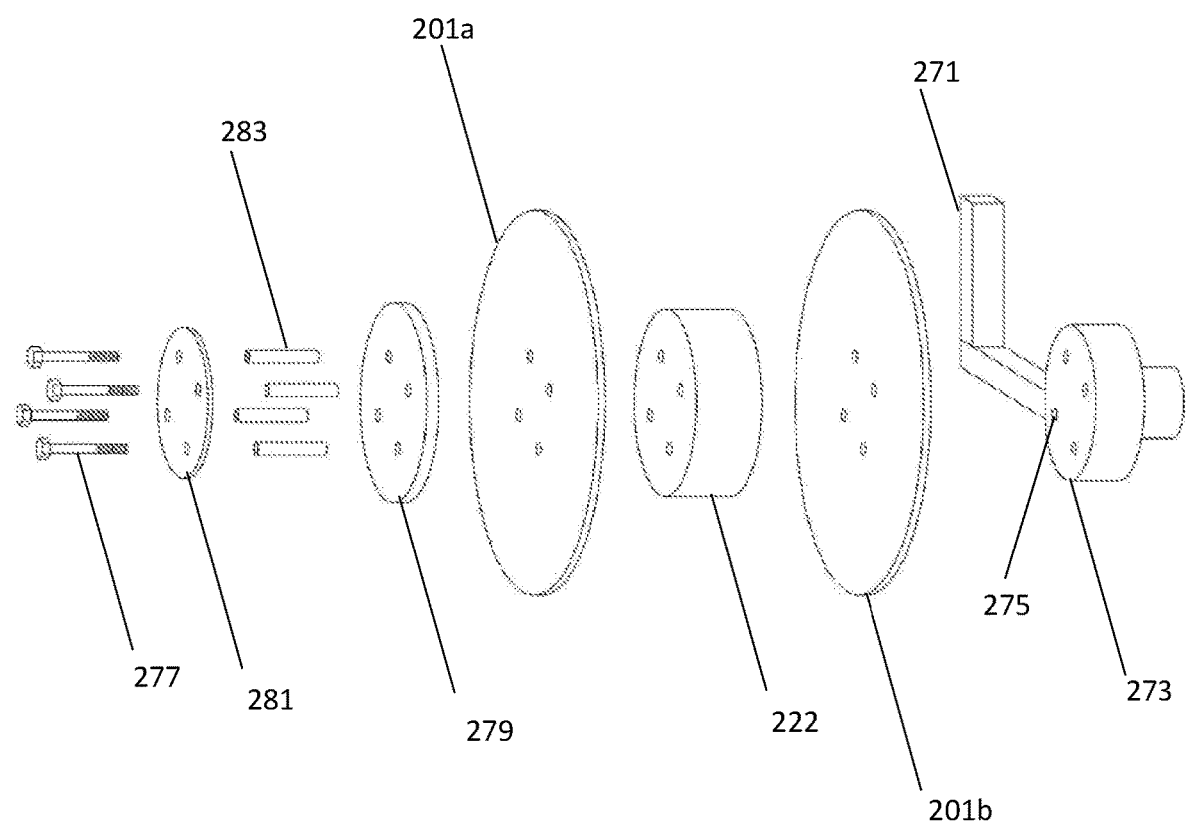
FIG. 10 is an exploded view of a hub and wheel assembly of the coulter assembly.

The coulter assemblies 200 can include an electrically isolated wheel hub assembly 1000, as shown in FIGS. 2 and 10. The wheel hub assembly 1000 can include a plurality of electrically isolating/insulating components to maintain electrical isolation between the two coulter discs/wheels 201. A connecting bracket 271 can extend from the implement and include a hub 273. The hub can be comprised of any suitable material, including but not limited to a composite, metal, alloy, polymer, or any electrically isolative material. The hub 273 can include a coupling means 275, such as one or more apertures for receiving one or more corresponding coupling means 277, such as fasteners or bolt 277. It should be understood that any suitable coupling means can be used to couple the components of the assembly 1000 together. In some embodiments, the hub 273 can have threaded apertures to accept threaded fasteners 277. Similarly, the hub 273 could have fixed threaded bolts protruding out a distance from the hub and a nut could be used to fasten the components on to the hub.

An isolation block/hub 222 can be located between the two coulter discs (201a, 201b). The isolation hub 22 allows for the two coulter discs to remain electrically isolated from each other when electric current is being applied to the coulter discs 201. As shown in FIG. 10, the coulter discs 201, isolation hub 222, isolation washer 279, and sealing washer 281 can include apertures that correspond to the hub apertures 275. A corresponding isolation rod 283 can be configured to run through the apertures of the various components of the isolated wheel hub assembly 1000. The isolation rods 283 can provide a housing of the fasters that couple the assembly 1000 together and thereby maintain the electrical isolation between the two coulter discs 201. The isolation rods can have a corresponding aperture that provides an opening for a portion of the fastener 277 to be housed within the isolation rod and inhibit contact of the fastener with any portion of the coulter discs 201. The isolation rods 283 can extend the width of at least the coulter discs 201, isolation hub 222, and the isolation washer 279. In some exemplary embodiments, the isolation rods 283 can extend the width of all the components of the wheel hub assembly 1000, wherein a portion extends beyond the sealing washer 281, as shown in FIGS. 2A and 2B.

In some exemplary embodiments, an optional sealing washer 281 can further be used to provide a final sealing element that provides an end point for the fasteners, wherein the isolation washer 279, first coulter disc 201, isolation hub 222, and second coulter disc 201b are located between the sealing washer and hub 273. In other exemplary embodiments, the isolation washer 279 can also operate as a sealing washer to maintain the elements between the hub 273 and the isolation washer 279. Similarly, a second isolating washer can be located between the second coulter disc 201b and the hub 273 to further ensure electrical isolation of each coulter disc 201. In some exemplary embodiments, the first and second coulter discs 201 can be injection points 27 for the electric field, wherein in one coulter disc is provided a positive charge and the corresponding second coulter disc is negatively charge.

The implement 100 of the present disclosure can optionally further include a fertilizer spreading means 500, that can include a fertilizer storage tank 53 that can be used to store a fertilizer mixture that can be spread simultaneously as the soil is treated using the electric shock treatment of the present disclosure. Similarly, the tank 53 can be used to contain a mixture comprising beneficial soil microbiome that can additionally or alternatively be applied after the electrical treatment. The fertilizer spreading means 500 can further include fertilizer fill/drain port 55, a primary supply line 56, and one or more fertilizer supply hoses 57. In some exemplary embodiments, the supply hoses 57 can be coupled to a corresponding knife 281 located proximate to a corresponding coulter assembly as shown in FIGS. 1-2. In other embodiments, the fertilizer spreading means can use a simple distributing means. A knife 281 can be located behind the coulter assembly and have an aperture that channels the fertilizer from the fertilizer supply hose to the ground. In some exemplary embodiment, the knife can be coupled or extend from the connecting bracket 271. In some exemplary embodiments, the knife 281 can be located between the two wheels of the coulter assembly and the fertilizer can be applied to the electric shock treatment zone 901. Additionally, in an exemplary embodiment the fertilizer spreading means can be fluidly connected to a distribution means including a tube 70 extending proximate to the top portion of the knife 281 down proximate to the bottom of the knife edge 73. The tube can have a first end 72 and a second end 74. Secondary supply lines 57 can be used to direct a fertilizer from the supply tank to the ground. The tube can be configured to more precisely apply the fertilizer or other composition to the soil. In one exemplary embodiment, the supply lines 57 can provide fertilizer to the first end 72 of the tube at which point the fertilizer can travel through the tube and be more precisely applied at the second end 74 of the tube behind the knife 281. This allows a user to simultaneously apply the electric treatment to the ground and applying a new fertilizer composition and/or other composition to the electrically treated soil. A tensioning means 90, such as a spring, can be used to apply pressure to the coulter to provide a compressive force and maintain the coulter in constant contact with the ground environment as the implement 100 is moving. In other embodiments, a more traditional and less precise fertilizer spreading means can be implemented using a sprayer, spreader, or other suitable distribution means.

Figure 9D:
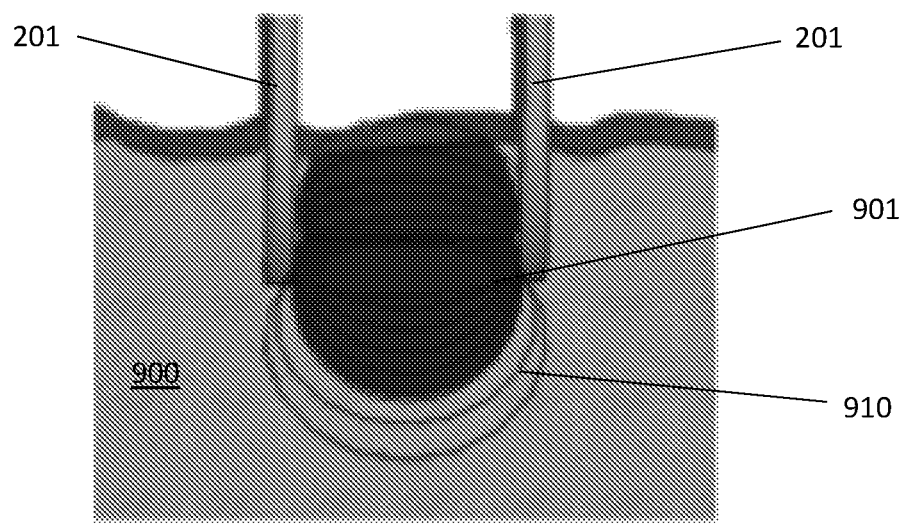
FIG. 9D is an illustration of an effective treatment zone in the soil produced by an exemplary embodiment of the system of the present disclosure using a coulter assembly.
Figure 9E:
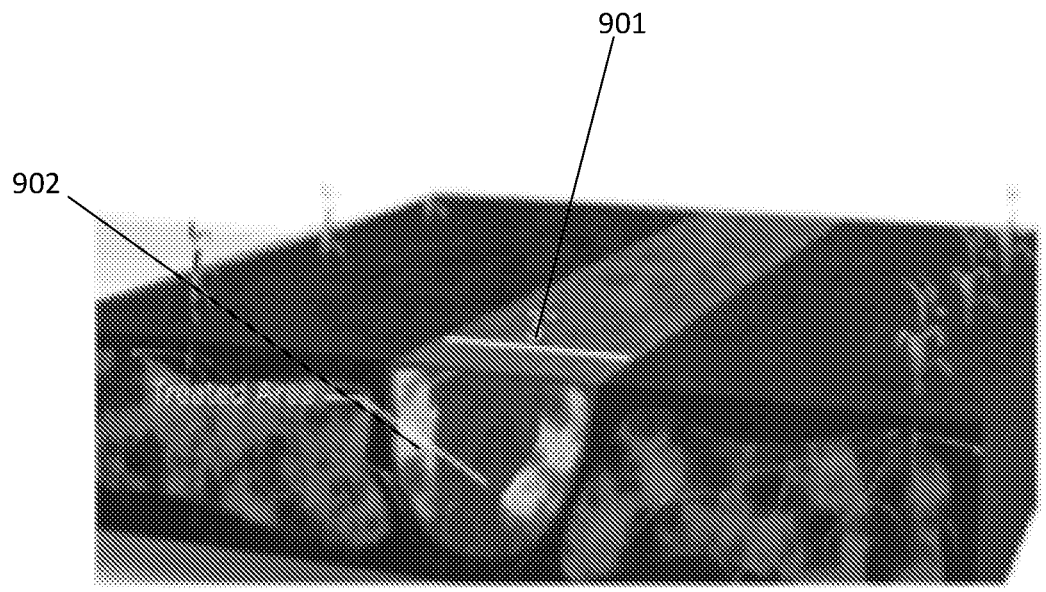
FIG. 9E is an illustration of microbial concentration of a treatment zone in the soil three weeks after the electrical application.
Figure 9F:
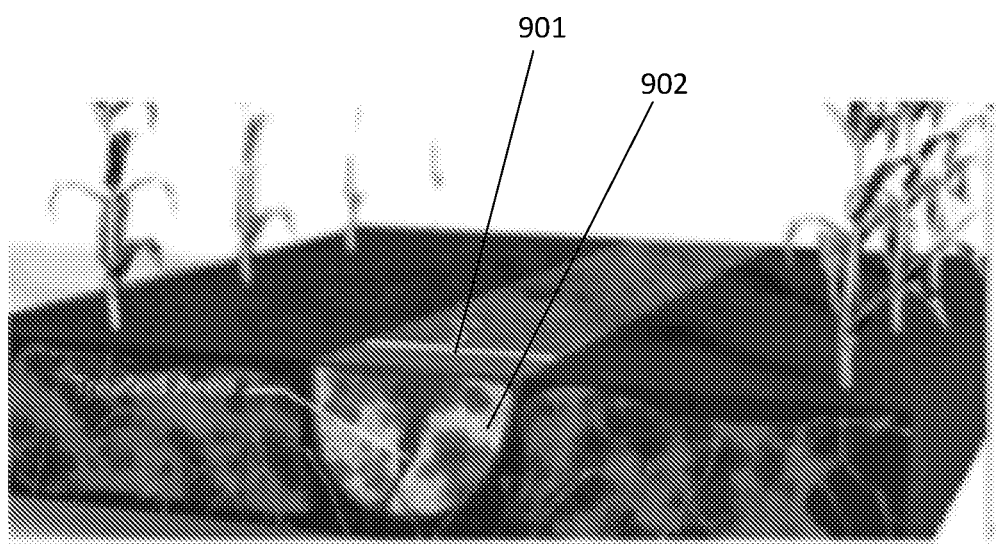
FIG. 9F is an illustration of microbial concentration of a treatment zone in the soil five weeks after the electrical application.

The apparatus and method of the present disclosure can use a group of other manufactured devices to work together in order to achieve microbial inhibition, and therefore nitrification inhibition, in soil due to electric shock. The microbes 903 located in the soil can be significantly reduced using the electric shock treatment for extended periods of time as shown in FIGS. 9E-9F. The primary technology involved in this apparatus of the present disclosure can be combined in a way that the electrical delivery system through the coulters 201 and the transformer driver 25 are critically important and unique in design of the present disclosure.

The injections points used in the present disclosure are designed to be a retrofit to existing manufactured equipment. They are designed in a way that keeps the positively charged injection points isolated from both the existing equipment and the negatively charged injection point. In one exemplary embodiment, a dual coulter assembly 200 can include a cleaning component 231 between the two coulter discs 201. The cleaning component can be configured to remove and debris or dirt for the coulter discs 201 to ensure proper electrical connection with the supply voltage wiring 13 and also ensure proper voltage application to the soil. The angle, length and width of the cleaning component 231 can prevent soil accumulation between the coulter discs 201 which would reduce the efficacy of the electrical treatment. The cleaning component 231 is also designed to interface with the isolating hub 222 that separates the two coulters. In one exemplary embodiment, the cleaning component 231 can extend from or be coupled to the connecting bracket 271.

In one exemplary embodiment, the isolating hub 222 can be comprised of an insulative material, such as a polymer, plastic, wood, or other suitable material, and configured to insulate the electrical current between the two coulters 210. Modification of this cleaning component 231 or the integration of the cleaning component into the hub or mounting bracket 251. The mounting bracket can have one or more voltage supply members extending to be in contact with or proximate to one of the coulter discs 201. In one exemplary embodiment shown in FIGS. 2A-2B, the bracket 251 have a first voltage supply arm 211 and a second voltage supply arm 212. The supply voltage wiring 13 can interface a voltage supply arm of the mounting bracket 251 at one or more interfacing points 261. At the interfacing points 261, the supply voltage wiring can extend through to interface with the surface of the coulter 201. As previously mentioned, one of side of the supply voltage wiring can deliver a positive charge while the corresponding supply voltage wiring can deliver a negative charge. The injection points can be inserted within a distance beneath the surface of the soil. The electric field can travel from one injection point to the corresponding injection point. In some exemplary embodiments, the electric field can be a pulsed electric field. The pulsed electric field can be pulsed at a pre-determined frequency.

In one exemplary embodiment, the voltage supply members 211 can house the supply voltage wiring and provide a connection from the supply voltage wiring 13 at the interfacing points 261 to the coulter disc 201. Similar to the isolating hub 222, the one or more voltage supply arms (211, 212) can be composed of an insulative material to insulate the electrical current from the supply voltage wire to the coulter 201. In one exemplary embodiment, the interfacing points can have a brush portion that interfaces with a face of one or more of the coulter wheels. Similarly, a secondary cleaning component can be located on at least one side of the coulter wheels. The secondary cleaning component can be the voltage supply members or part of the primary cleaning component 231. In some embodiments, the supply voltage wire 13 can be housed within each of the voltage supply arms. The supply voltage wire can interface with the respective coulter disc and the injection points 261.

The transformer drivers 25 used in the present disclosure can produce pulsed electric fields between the injection points 28 in the soil 900. The drivers 25 are configured to produces enough electric field intensity and duration between the injection points in the soil. In one exemplary embodiment, the driver 25 can use a zero-voltage switch to produce the necessary frequency of the current. The specific electric fields produced can be about 10,000 v/cm or greater for sufficient control of flora in the soil treatment zone. In one exemplary embodiment, a frequency of the pulsed electric field can be about 75% of the electric field density. In one exemplary embodiment, if treating about 1 cm of soil with about 10,000 volts, the required frequency to produce irreversible electroporation of cell walls can be at least about 7,500 pulses/second. Similarly, when the electric treatment is applied to the soil, a pulsing effect can be achieved using both AC and/or DC current in the application. Pulsing or arching within the soil is largely dependent upon soil mineral and moisture content. FIGS. 3-6 are some exemplary embodiments of suitable transformer drivers that can be used by the apparatus of the present disclosure. An integrated circuit, such as one or more MOSFETs in the zero-voltage switch can produce frequencies high enough to be practical as an in situ retrofit to agriculture equipment. Aspects of the present disclosure can be used to retrofit existing implements such as planters and fertilizer applicators that can travel at practical speeds between about 1 mph and up to 30 mph, or between about 3 mph and 10 mph, or at about 4 mph. Any suitable frequency driver can be used, such as those illustrated in FIG. 3-4. The frequency can be manipulated by changing the resistors and/or capacitors in the circuit.

Figure 3:
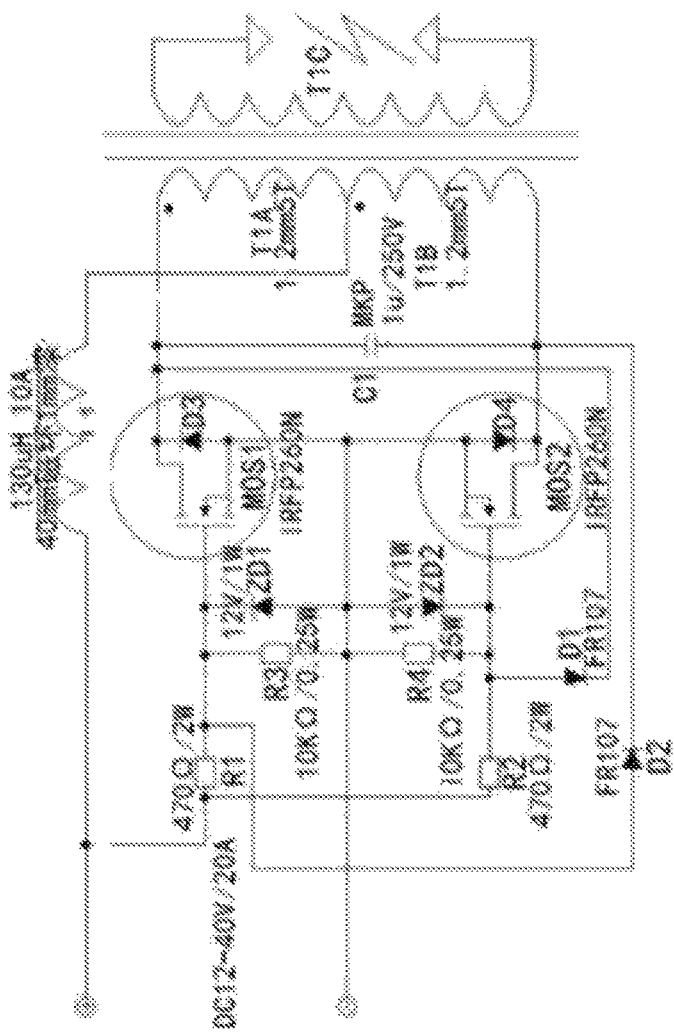
FIG. 3 is an exemplary transformer driver schematic that can be used with the apparatus of the present disclosure.

As illustrated in FIG. 3, a transformer driver 25 can be used to modulate the frequency and efficiency of the electrical current to a desired frequency. The driver 25 can use MOSFET circuitry for bridge gates to switch the driver on and off and desired frequencies to generate a pulsed electric field between the two insertion points 28 of the electrical injector system 27. Similarly, a driver board design can run at high frequency. The frequency can be manipulated by changing resistors and capacitors of the circuit.

Figure 4:
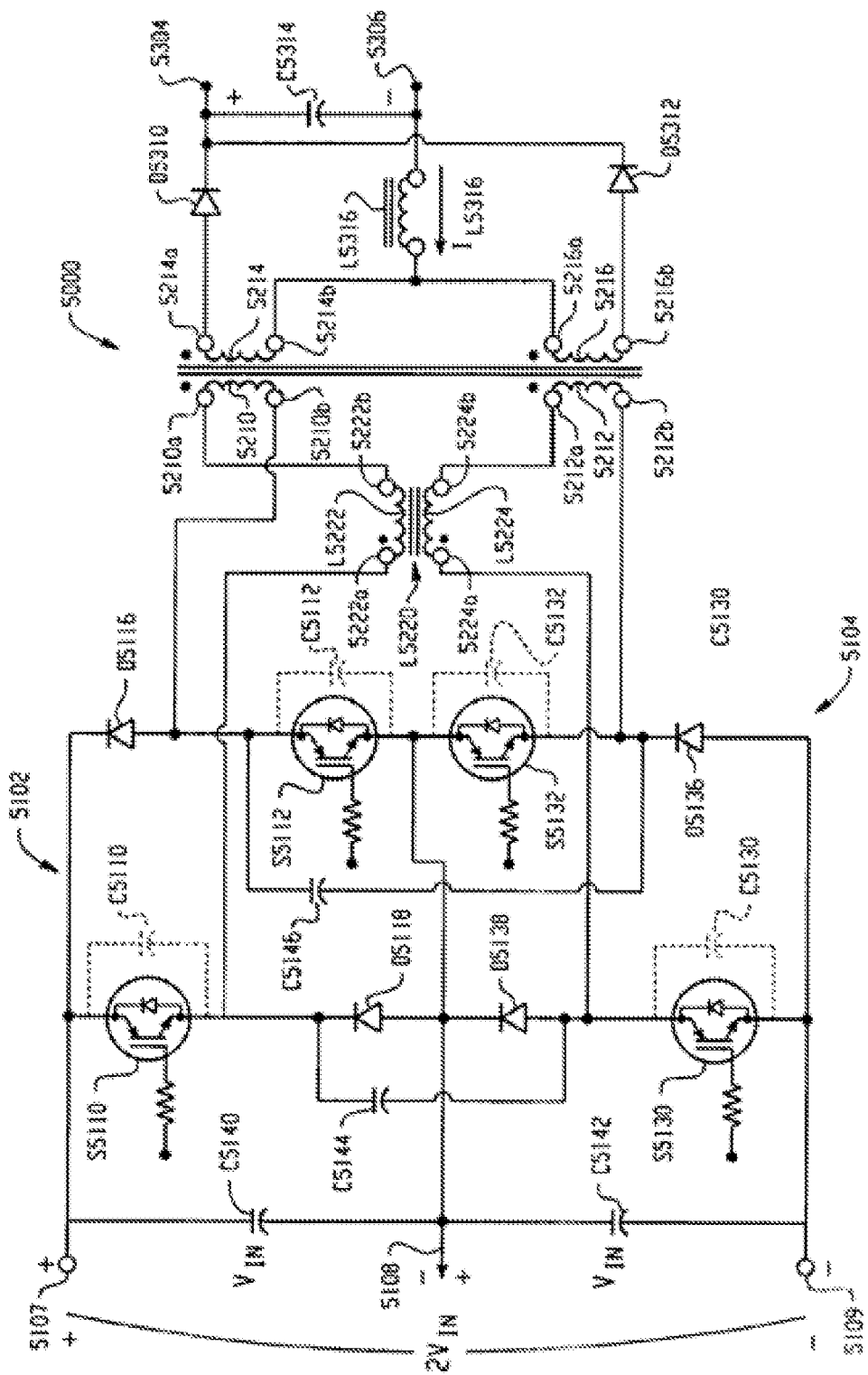
FIG. 4 is a schematic diagram of exemplary embodiments of a high frequency driver that can be used with the apparatus of the present disclosure.

As illustrated in FIG. 4, an exemplary apparatus of the present disclosure can include a high frequency driver that could be used in an exemplary embodiment of the present disclosure. The driver can include a first bridge circuit 5102 comprises a first switch S5110 and a second switch S5112. A diode D5116 connects the input terminal 5107 and the collector of the switch S5110 to a second terminal 5210b of the first primary winding 5210. The second terminal 5210b is also directly connected to the collector of the second switch S5112. The emitter of the switch S5112 is connected to the bank node 5108, and the emitter of the first switch S5110 is connected to the bank node 5108 through diode D5118. Furthermore, the emitter of the first switch S5110 is also connected to the first terminal 5210a of the first primary winding 5210 through a first winding L5222 of a coupled inductor L5220. When the switches S5110 and S5112 are closed, an input voltage VIN is applied across the terminals 5210a to 5210b of the first primary winding 5210

The second bridge circuit 5104 is symmetric about the bank node 5108 to the first bridge circuit 5102. The second bridge circuit 5104 comprises a third switch S5130 and a fourth switch S5132. A diode D5136 connects the input terminal 5109 and the emitter of the third switch S5130 to a second terminal 5212b of the second primary winding 5212. The second terminal 5212b is also directly connected to the emitter of the fourth switch S5132. The collector of the switch S5132 is connected to the bank node 5108, and the collector of the third switch S5130 is connected to the bank node 5108 through diode D5138. Furthermore, the collector of the third switch S5130 is also connected to the first terminal 5212a of the second primary winding 5212 through a second winding L5224 of the coupled inductor L5220. When the switches S5130 and S5132 are closed, an input voltage VIN is applied across the terminals 5212b to 5212a of the second primary winding 5210

The input capacitors C5140 and C5142 couple the bank node 5108 to the input terminals 5107 and 5109, respectively. The DC input voltage applied across the terminals 5107 and 5109 is evenly divided across the input capacitors C5140 and C5142. The input capacitors C5140 and C5142 are sufficiently large so that the DC voltage components do not appreciably change during a transition of the switches S5110, S5112, S5130 and S5132

A first coupling capacitor C5144 bypasses the diodes D5118 and D5138 and provides AC coupling of the emitter of the first switch S5110 to the collector of the third switch S5130. Likewise, a second coupling capacitor C5146 provides AC coupling of the collector of the second switch S5112 to the emitter of the third switch S5132. The coupling capacitors C5144 and C5146 provide for tight AC coupling between the switches S5110, S5112, S5130 and S5132 that occurs naturally in a conventional full bridge converter. The coupling capacitor C5144 is coupled to the first terminals 5210a and 5212a through the coupled inductor L5220, and thus is charged to a DC voltage substantially equal to VIN. Similarly, the coupling capacitor C5146 is coupled to the second terminal 5210b and 5212b, and thus is charged to a DC voltage substantially equal to VIN. Preferably the coupling capacitors C5144 and C5146 have capacitances that are greater than the capacitance of the switches S5110, S5112, S5130 and S5132 so that the DC voltage component of the coupling capacitors C5144 and C5146 does not appreciably change during transition of the switches S5110, S5112, S5130 and S5132. The DC blocking of the capacitors C5144 and C5146 thus enables the switches to be split in separate bridges across the first and second primary windings 5210 and 5212

The output circuit 5302 illustratively can further include diodes, such as D5310 and D5312, an output capacitor C5314 and an output inductor L5316 configured as a buck converter output stage while a buck converter output stage is shown, other converter stages may be used, such as in boost converter stage. The first terminal 5214 of a first secondary winding 5214 can be connected to the output terminal 5304 and the output capacitor C5314 through the diode D5310, and a second terminal 5216b of a second secondary winding 5216 can be connected to the output terminal 5304 and the output capacitor C5314 through a diode, such as D5312. The second terminal 5214b of the first secondary winding 5214 is connected to the first terminal 5216a of the second secondary winding 5216. The output terminal 5306 is connected to the second terminal 5214b and the first terminal 5216a through the output inductor L5316

Thus, when the switches S5110 and S5112 are closed and the switches S5130 and S5132 are open, the diode D5310 is forward biased and current flows from the first terminal 5214a, through the diode D5310, through the output load and capacitor C5314, and returns through the inductor L5316. D5312 is reversed biased and does not conduct. Likewise, when the switches S5130 and S5132 are closed, diode D5312 is forward biased and current flows from the second terminal 5216b, through the diode D5312, through the output load and capacitor C5314, and returns through the inductor L5316. D5310 is reversed biased and does not conduct. Therefore, current flow alternates between the two primary windings 5210 and 5212.

While the switches S5110, S5112, S5130 and S5132 are illustratively IGBT devices coupled to base resistors, alternative switches may be realized by using MOSFETs, BJTs, or other switching devices. It is to be understood that the operation of the series connected full bridge circuit 5000 can take into account the inherent parasitic capacitance of the particular device used to realize the switches S5110, S5112, S5130, and S5132. Accordingly, each switch S5110, S5112, S5130, and S5132 is thus bypassed by the inherent capacitance of the device used to realize the switch. Furthermore, depending on the capacitance of the switching devices used, separate bypass capacitors may also be added across the switches to increase ZVS performance. The phantom capacitors C5110, C5112, C5130, and C5132 in FIGS. 4-6

An exemplary controller for the switches S5110, S5112, S5130 and S5132 can include a UC3879 Phase-Shifted PWM Controller manufactured by Unitrode Corporation/Texas Instruments. The UC3879 integrated circuit provides control, decoding, protection and drive functions for operation of a DC/DC converter with phase-shifted control. During operation of the series connected split full bridge circuit 5000, the switches S5110, S5112, S5130 and S5132

Switch S5110 Switch S5112 Switch S5130 Switch S5132 State Status Status Status Status 1 ON ON OFF OFF 2 OFF ON ON OFF OFF 3 OFF ON ON OFF 4 OFF OFF ON OFF 5 OFF OFF ON ON 6 OFF OFF OFF ON 7 ON OFF OFF ON 8 ON OFF OFF OFF 9 ON ON OFF OFF FIGS. 5A-5E provide the equivalent circuit diagram for the circuit of FIG. 4 when the switches are in the Switch States 1-5. During Switch State 1, shown in FIG. 5A, switches S5110 and S5112 are closed, and an input voltage of VIN is applied across the first primary winding terminals 5210a and 5210b. Accordingly, an equal voltage is forced across the primaries 5212a and 5212b, as the primary windings 5210 and 5212 share the same transformer core. A current Ip flowing through the first primary winding 5210 conducts through the path 5400 as shown. Because the switches S5130 and S5132 are open, very little current flows through the second bridge 5104, and the capacitors C5130 and C5132 are each charged to a magnitude of approximately VIN. Thus, the voltages on the first and second bridges 5102 and 5104.

Figure 5A:
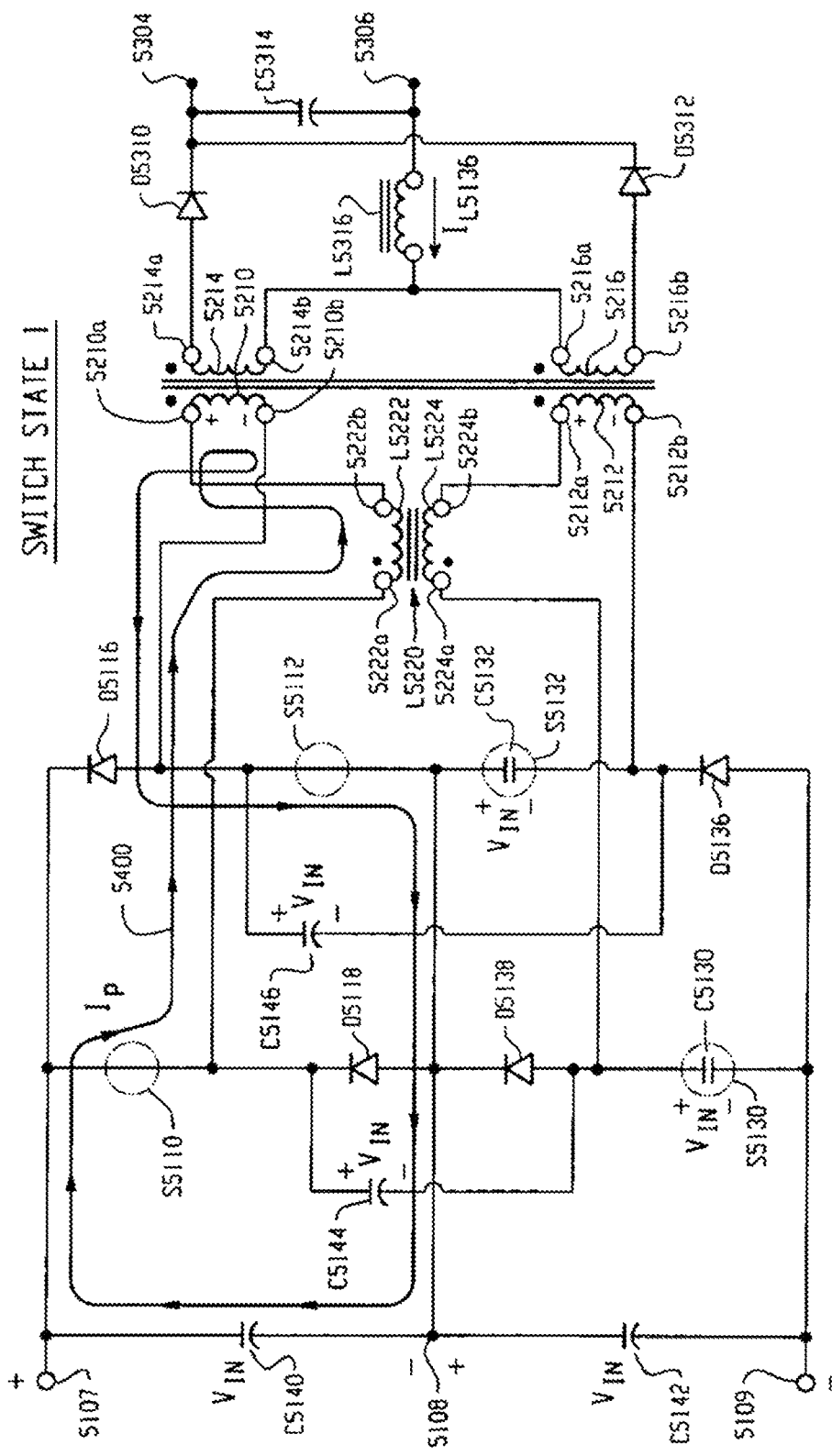
FIGS. 5A-E are schematic diagrams of exemplary embodiments of high frequency drivers that can be used with the apparatus of the present disclosure.
Figure 5B:
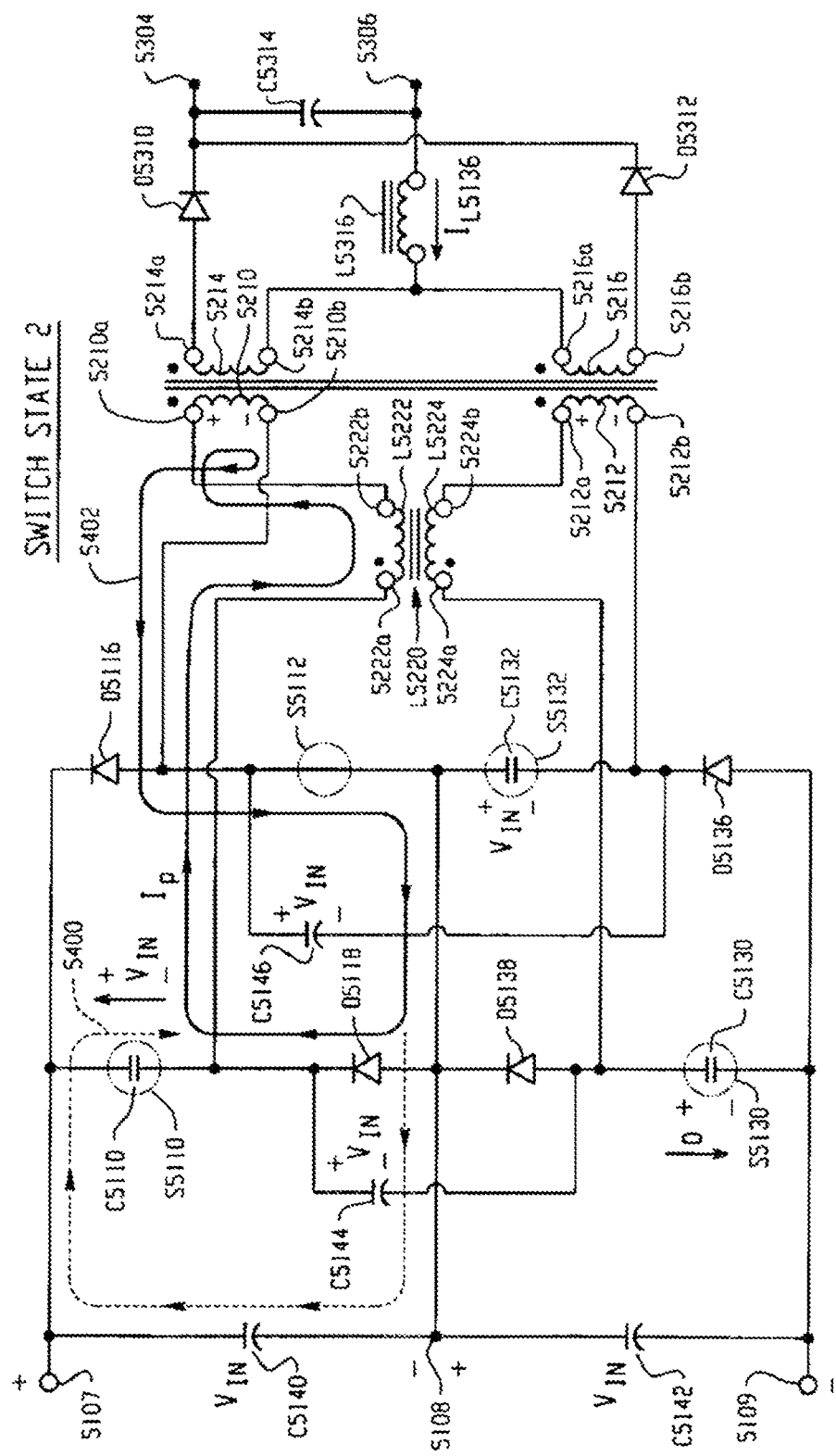
Figure 5C:
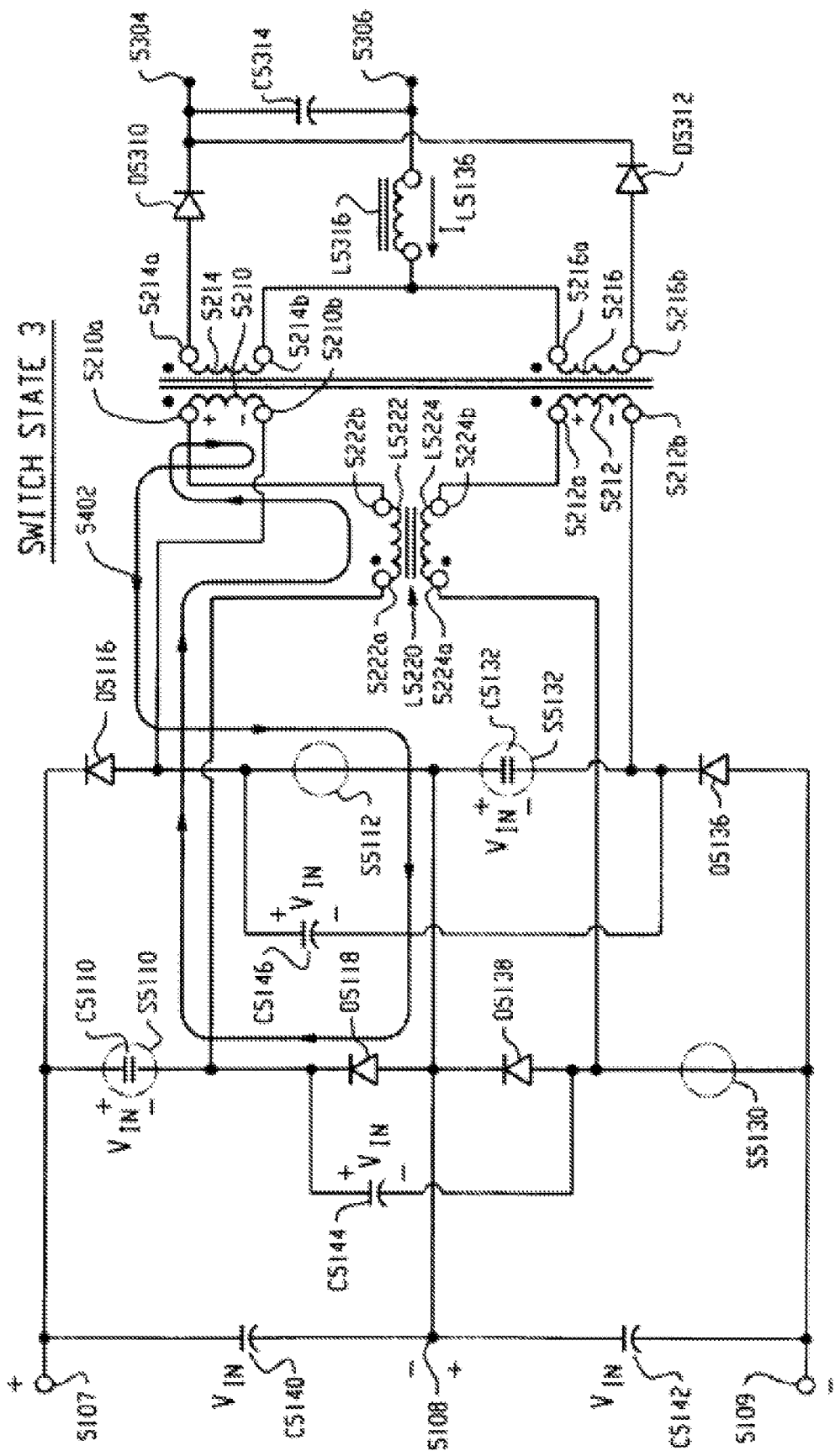

During the transition to Switch State 2, as shown in FIG. 5B, S5110 is turned off, and the voltage across the primary terminals 5210a and 5210b rapidly collapses to zero. Likewise, the voltage across the primary terminals 5212a and 5212b also collapses to zero. The output inductor L5316 provides energy to the output load through the current IL5316. The current IL5316 decreases as the inductor L5316 continues to provide power to the output load. As the current IL5316 freewheels through diode D5310, the primary current Ip is induced in the primary winding 5210. However, as the voltage across the primary winding 5210 collapses, the current Ip charges the capacitor C5110 up to a voltage of VIN. This causes the voltage across the capacitor C5130 to discharge to zero volts. Once the voltage across the open switch S5110 is at VIN, the current 1p conducts through the diode D5118 and through the path 5402 as shown. The switch S5130 is then turned on when the voltage across the capacitor C5130 is at zero volts, resulting in the equivalent circuit of FIG. 5

Figure 5D:
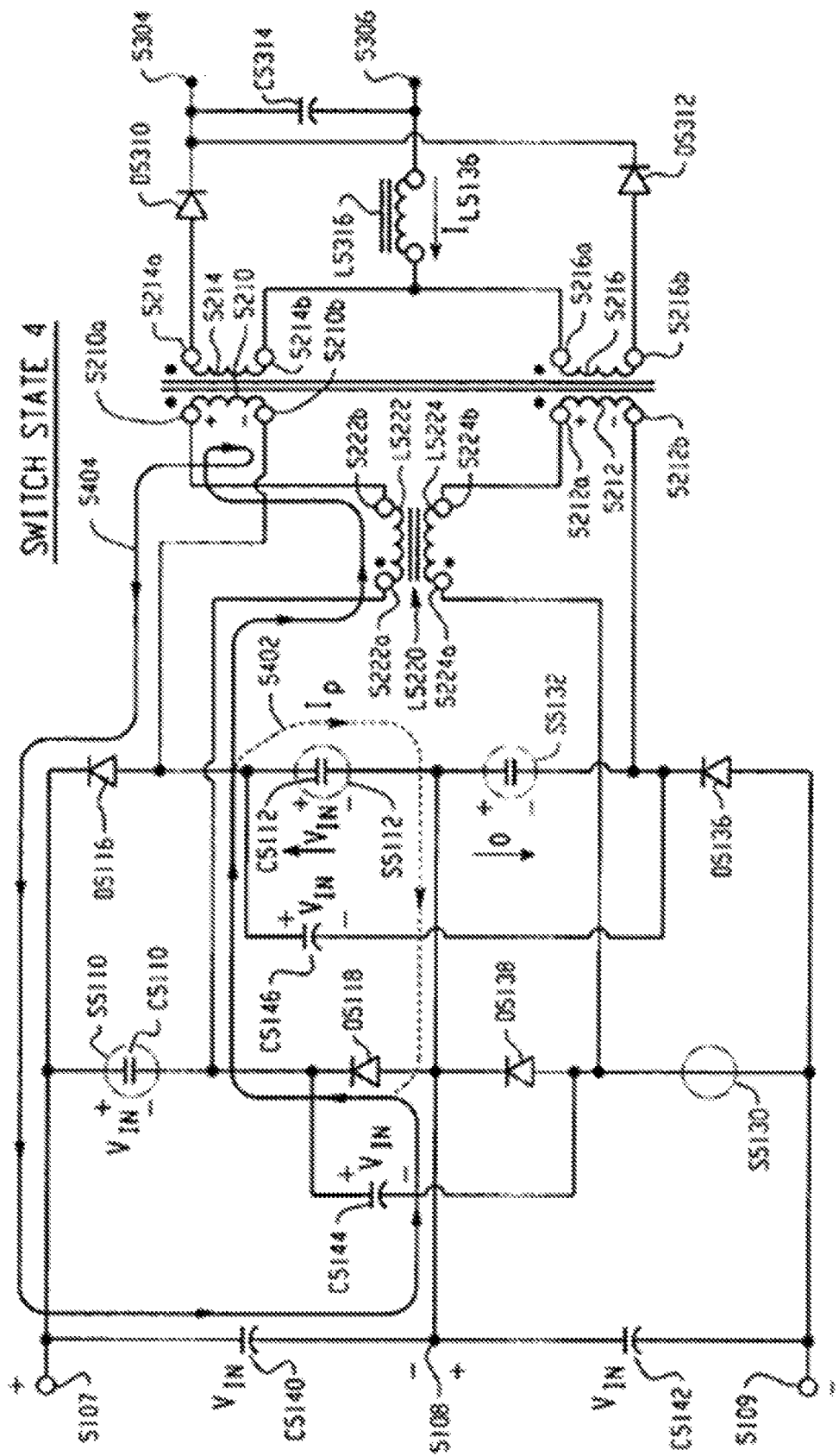
Figure 5E:
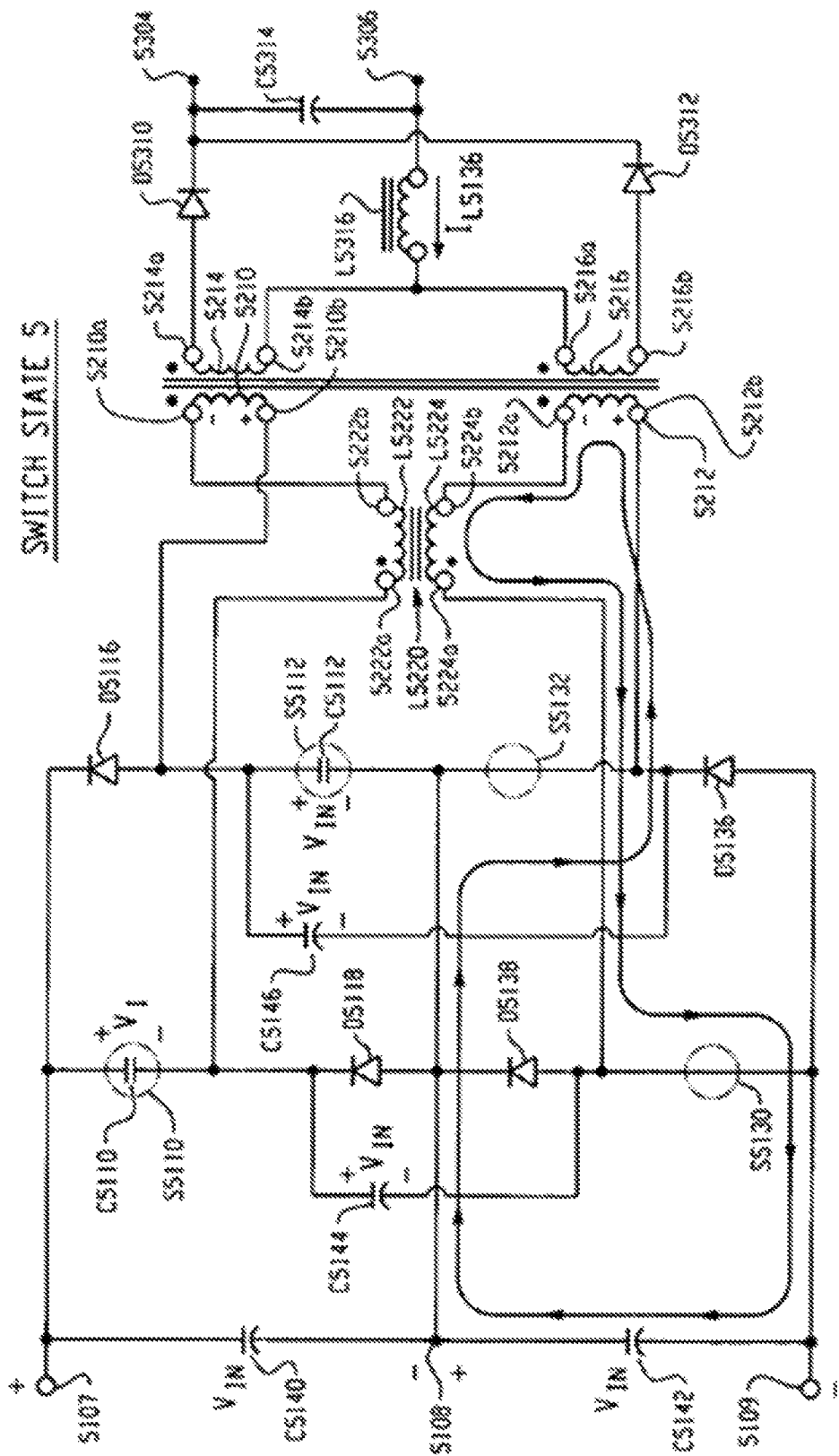

Switch S5112 is then turned off, resulting in the equivalent circuit of FIG. 5D. During this transition, the coupled inductor L5220 provides energy to induce the primary current Ip. The current Ip charges the capacitor C5112 up to a voltage of VIN. Once the voltage across the across the capacitor C5112 is at VIN, the current Ip conducts through the diode, D5116 and D5118, through the path 5404 as shown. Thus, the voltage across the capacitor C5112 is clamped to the voltage across the capacitor C5146, which is equal to VIN. Therefore, the voltage across the capacitor C5132 is at zero volts. The switch S5132 is then turned on, resulting in the equivalent circuit of FIG. 5

Transition through the remaining Switch States 6-9 is substantially similar to transition through Switch States 2-5, except that the polarities of the voltages across the primary windings 5210 and 5212 are reversed. Thus, ZVS switching is provided for all switches S5110, S5112, S5130 and S5132

It is to be appreciated that the windings L5222 and L5224 may also be separate on separate inductors that are not coupled. However, this tends to reduce the coupling between the transformer primary windings 5210 and 5212 provided by the coupled inductor L5220, which impedes ZVS performance. Thus, a coupled inductor L5220 comprising the windings L5222 and L5224 is preferred. Illustratively, the windings L5222 and L5224

Figure 6:
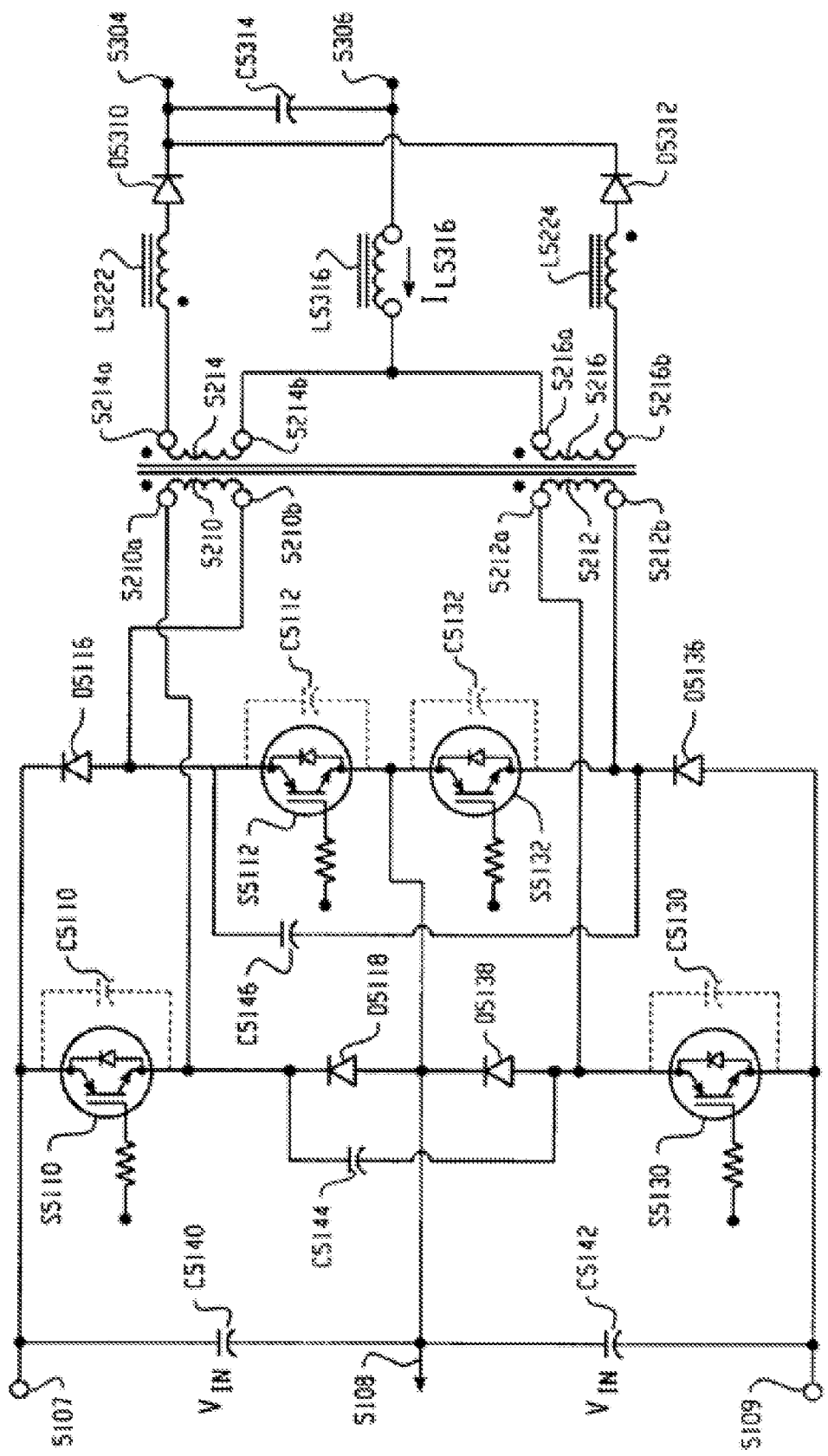
FIG. 6 is a schematic diagram of exemplary embodiments of a high frequency driver that can be used with the apparatus of the present disclosure.

An alternative embodiment is shown in FIG. 6. In this embodiment, the coupled inductor L5220 is connected to the secondary windings 5214 and 5216 of the transformer 5202. The first inductor winding L5222 is connected between the first terminal 5214a of the first secondary winding 5214 and the diode D5310, and the second inductor winding L5224 is connected between the second terminal 5216b of the second secondary winding 5216 and the diode D5312. ZVS switching occurs in the same manner as described with respect to FIGS. 5A-5E In one exemplary method of application, the apparatus can be implemented at a speed of about 1 mph to about 6.5 mph, with the electrical injector assembly having about a 20" metal round coulter will remain in contact with one square inch of soil for about 12 ms. The pulsed electric field between two or more 20" coulters at about a three-inch width spacing can use about at least about 76,2000 volts in intensity with a minimum frequency of about 56,250 pulses per second and a maximum frequency of about 333,000 pulses per second.

An exemplary embodiment of the present disclosure can be manufactured by combining an electric generator, voltage transformers, and high frequency transformer drivers to any type of injection point that can be directed into the soil at or near the site of fertilizer application or desired soil-zone control. There are many different options for configuration of electric wires, control schemes, and injection points that could be used to create a system that is capable of delivering pulsed electric fields to a narrow band of soil around the application of interest.

The electric generator and delivery system are necessary to operate this system successfully. The control system is optional but may provide the operator with the ability to optimize the performance of the electric shock soil treatment system. The delivery system could be comprised of many different types of physical designs that would accomplish the same result of delivering pulsed electric fields into soil.

Some types of physical design of the delivery system could produce more efficient results, primarily in regard to material conductivity properties. The same type of manipulation is true for the electric generator and control system. However, the delivery system must be configured to electrically isolates one injection point from another and the application points must be within about 1" to about 12", or about 1" to about 6" from each other to provide optimal performance and control over the bacterial processes inside the soil zone between the application points.

A user could implement an embodiment of the present disclosure to apply a band of electricity to each row around a band of fertilizer that is applied in a crop production setting. By applying a sufficient amount of electricity to a band of soil, microbial activity will be eliminated. Therefore, nitrogen conversion processes will be halted until the bacteria re-propagates in the treated area of soil. The user could then separately after applying the electrical treatment disperse a fertilizer and/or beneficial microbial solution. In some exemplary embodiments, the secondary fertilizer/microbial treatment can be applied immediately/contemporaneously after the electrical treatment using a fertilizing system of the implement during the same pass with the implement.

Additionally, an exemplary embodiment of the apparatus of the present disclosure could be used for the purpose of sterilizing soils to control the spread of soil-borne diseases, prevent weed germination, and even terminate certain populations of weeds.

The apparatus and method of the present disclosure can be most efficiently implemented when the electric field is applied in an agronomically beneficial location to the row crop—i.e. around the applied fertilizer or planted seed. The injection points may deliver the electric field into the soil at depth that is equally beneficial to encompassing the targeted control zone. Ideal setups for this technology would be creating a treated zone in the soil of three inches wide by approximately about 6 inches deep. As shown in FIGS. 9A-F, the double coulter discs 201 can be engaged with the soil of the ground as shown in FIG. 9A. The ground soil 900 can contain one or more microbes 902 with in the soil as shown in FIG. 9B. The system of the present disclosure can then generate an electric field between the two coulters, thereby applying the electric field to treat soil located proximate to the coulters (FIG. 9C). The treatment zone 901 of the electric field can primarily include the soil located between the two coulters and can extend from the top level of the soil and extend down past the bottom edge of the coulter discs 201 as shown in FIG. 9D. FIGS. 9E and 9F provided an illustration of the treated soil three and five weeks after the electric treatment application respectively.

The technology outlined in the present disclosure can be applied as a single pass operation in order to treat the soil, but it is intended to be easily coupled with other pass operations through the field. This would require less time and fuel to treat the desired soil and the technology is designed in a way that it can be applied in conjunction with other agricultural practices. The use of the present innovated equipment substantially reduces costs and risks that currently bar the efficient substitution of pesticides by the electrocution process.

The present invention does not limit its application to the details and stages described herein. The present invention may have other embodiments and may be practiced or executed in a variety of ways. It is understood that the terminology used has the purpose of description and not limitation.

What is claimed is:

1. An apparatus for treating soil with an electrical voltage at a pulsating frequency, wherein the apparatus comprises:
    an electric generator;
    high voltage wiring;
    control wiring;
    a unit box comprising:
        a line output transformer; and
        a high frequency transformer driver configured to condition an electric current and modulate a frequency of the electric current from the electric generator to the line output transformer, wherein the high frequency transformer driver includes a MOSFET circuitry for bridge gates configured to switch the high frequency transformer driver from an ON position to an OFF position within a pre-determined frequency range between about 10,000 hertz to about 200,000 hertz;
    one or more electrical injectors configured to deliver the electrical voltage to the soil, wherein the electrical injector comprises a coulter assembly comprising a knife, a first coulter disc and a second coulter disc, wherein said electric current is provided from the transformer to each of the first and second coulter discs, wherein the first coulter disc is provided positively charged electric current and the second coulter disc is provided negatively charged current;
    supply voltage wiring configured to provide the electric current from the transformer to the one or more electrical injectors;
    a power storage device; and
    a fertilizing means comprising a composition storage tank and at least one supply line configured to provide a fertilizing composition to the soil after the soils has been contacted by the coulter assembly, wherein said knife further comprises a tube having a first end and a second end, wherein the second end terminates proximate to an edge of a knife blade, wherein the tube is configured to receive a composition from the storage tank from the supply line.

2. The apparatus of claim 1, wherein said unit box further comprises a control module configured to control the voltage and frequency of the transformer driver.

3. The apparatus of claim 1, further comprising a power storage device configured to provide an even current of electricity from the electric generator to the unit box.

4. The apparatus of claim 1, wherein the power storage device is one or more batteries.

5. The apparatus of claim 1, wherein the coulter assembly includes an electrically isolated wheel hub assembly comprising:
    a first hub, wherein said first hub can have a first coupling means;
    an electrically isolating hub, wherein said electrically isolating hub is positioned between said first coulter disc and second coulter disc, wherein said electrically isolating hub is configured to maintain complete isolation of electric current supplied to each of the coulter discs, wherein said first coulter disc, second coulter disc, and electrically isolating hub are coupled to the first hub using a second coupling means.

6. The apparatus of claim 5, wherein said second coupling means includes one or more fasteners, wherein said one or more fasteners is shrouded using an isolating rod configured to inhibit contact of the one or more fasteners with the first and second coulter disc.

7. The apparatus of claim 6, further comprising at least one electrically isolating washer positioned between the second coupling means and the first coulter disc, wherein the isolating rod extends the entire width of the first coulter disc, second coulter disc, at least one electrically isolating washer, and electrically isolating hub.

8. The apparatus of claim 7 further comprising a cleaning component configured to remove debris from the first and second coulter discs.

9. A method for treating soil with electricity comprising:
    providing the apparatus of claim 1; and
    applying electricity to the soil in a pre-determined voltage range at a pre-determined modulated frequency range using the transformer driver.

10. The method of claim 9, wherein the pre-determined voltage range is between about 5,000 volts to about 500,000.

11. The method of claim 10, wherein the pre-determined modulated frequency ranges is between about 10,000 hertz and about 200,000 hertz.

12. The method of claim of claim 11, applying a fertilizer composition to the soil after the electric treatment.

* * * * *